(12) United States Patent
Uno

(10) Patent No.: US 9,809,954 B2
(45) Date of Patent: Nov. 7, 2017

(54) BULLDOZER

(71) Applicant: KOMATSU LTD., Tokyo (JP)

(72) Inventor: Akira Uno, Komatsu (JP)

(73) Assignee: KOMATSU LTD., Tokyo (JP)

(*) Notice: Subject to any disclaimer, the term of this patent is extended or adjusted under 35 U.S.C. 154(b) by 398 days.

(21) Appl. No.: 14/389,513

(22) PCT Filed: Jul. 3, 2014

(86) PCT No.: PCT/JP2014/067763
§ 371 (c)(1),
(2) Date: Sep. 30, 2014

(87) PCT Pub. No.: WO2015/064152
PCT Pub. Date: May 7, 2015

(65) Prior Publication Data
US 2016/0265191 A1 Sep. 15, 2016

(51) Int. Cl.
*F01N 1/00* (2006.01)
*F01N 3/10* (2006.01)
(Continued)

(52) U.S. Cl.
CPC ............ *E02F 9/0866* (2013.01); *B60K 13/02* (2013.01); *B60K 13/04* (2013.01); *E02F 3/7609* (2013.01);
(Continued)

(58) Field of Classification Search
CPC ............... F01N 13/009; F01N 13/1805; F01N 13/1811; F01N 2340/04; F01N 2470/18;
(Continued)

(56) References Cited

U.S. PATENT DOCUMENTS 8,141,535 B2  3/2012  Olsen et al.
8,720,638 B1  5/2014  Nakagami et al.
(Continued)

FOREIGN PATENT DOCUMENTS

CN  103747975 A  4/2014
CN  103842630 A  6/2014
(Continued)

OTHER PUBLICATIONS

The International Search Report for the corresponding international application No. PCT/JP2014/067763, dated Sep. 2, 2014.
(Continued)

*Primary Examiner* — Phutthiwat Wongwian
*Assistant Examiner* — Diem Tran
(74) *Attorney, Agent, or Firm* — Global IP Counselors, LLP

(57) ABSTRACT

A bulldozer includes a blade, an engine, first and second exhaust treatment devices that treat exhaust from the engine, and an engine cover. The first exhaust treatment device is disposed in front of the engine and lower than a first upper surface of the engine. The second exhaust treatment device is disposed above the engine. The engine cover includes a second upper surface sloping forward and downward. The engine cover covers the engine and the first and second exhaust treatment devices. Longitudinal directions of the first and second exhaust treatment devices extend along a vehicle lateral direction. In a top view of the bulldozer, the second exhaust treatment device includes a portion overlapping the engine. As seen from a side of the bulldozer, a front edge of the second exhaust treatment device is positioned forward of a rear edge of the first exhaust treatment device.

17 Claims, 8 Drawing Sheets

(51) Int. Cl.
*E02F 9/08* (2006.01)
*B60K 13/04* (2006.01)
*E02F 3/76* (2006.01)
*F01N 13/00* (2010.01)
*B60K 13/02* (2006.01)
*E02F 9/16* (2006.01)
*F01N 13/18* (2010.01)
*E02F 3/84* (2006.01)
*F01N 3/20* (2006.01)
*F01N 3/021* (2006.01)

(52) U.S. Cl.
CPC ............ *E02F 9/0891* (2013.01); *E02F 9/163* (2013.01); *F01N 13/009* (2014.06); *F01N 13/1805* (2013.01); *F01N 13/1811* (2013.01); *B60Y 2200/411* (2013.01); *E02F 3/844* (2013.01); *F01N 3/021* (2013.01); *F01N 3/103* (2013.01); *F01N 3/2066* (2013.01); *F01N 2340/04* (2013.01); *F01N 2470/18* (2013.01); *F01N 2470/22* (2013.01); *F01N 2590/08* (2013.01); *F01N 2610/02* (2013.01)

(58) Field of Classification Search
CPC ............ F01N 2470/22; F01N 2590/08; F01N 2610/02; F01N 3/021; F01N 3/103; F01N 3/2066; E02F 3/844; B60K 13/02; B60K 13/04

USPC .................................................... 60/299, 323
See application file for complete search history.

(56) References Cited

U.S. PATENT DOCUMENTS

| | | |
|---|---|---|
| 2010/0031644 A1 | 2/2010 | Keane et al. |
| 2012/0247861 A1 | 10/2012 | Mizuno et al. |
| 2013/0277135 A1 | 10/2013 | Sakai et al. |
| 2014/0262589 A1 | 9/2014 | Sakamoto |
| 2015/0211209 A1 | 7/2015 | Okuda et al. |

FOREIGN PATENT DOCUMENTS

| | | |
|---|---|---|
| JP | 2005-113674 A | 4/2005 |
| JP | 2011-47390 A | 3/2011 |
| JP | 2012-136845 A | 7/2012 |
| JP | 2013-227729 A | 11/2013 |
| JP | 5481604 B1 | 4/2014 |
| JP | 5507762 B1 | 5/2014 |
| WO | 2011/152306 A1 | 12/2011 |
| WO | 2014/054192 A1 | 4/2014 |

OTHER PUBLICATIONS

Office Action for the corresponding Chinese application No. 201480001037.4, dated May 15, 2017.

BULLDOZER

CROSS-REFERENCE OT RELATED APPLICATIONS

This application is a U.S. National stage application of International Application No. PCT/JP2014/067763, filed on Jul. 3, 2014.

BACKGROUND

Field of the Invention

The present invention relates to a bulldozer, which is one type of work vehicle.

Background Information

In Japanese Laid-Open Patent Publication 2005-113674, a bulldozer is disclosed in which the upper surface of the engine cover is sloped forward and also downward (refer to Japanese Laid-Open Patent Publication 2005-113674). With this bulldozer the workability is enhanced, since the operator is able visually to check the upper portion of the blade, i.e. of the working implement.

On the other hand, from the standpoint of protection of the natural environment, a work vehicle such as a bulldozer needs to be equipped with exhaust purification (refer to Publication of U.S. Pat. No. 8,141,535 B2). Therefore, it is nowadays practiced to mount an exhaust treatment device to a work vehicle. The term "exhaust treatment device" means, for example, a diesel particulate filter (DPF) device, a selective catalytic reduction (SCR) device, a diesel oxidation catalyst (DOC) device, or the like. From these various exhaust treatment devices, modern work vehicles need to be provided with either two or more exhaust treatment devices of the same type, or two or more exhaust treatment devices of different types.

SUMMARY

If two or more exhaust treatment devices are disposed above the engine in order for the exhaust treatment devices to be housed in the engine compartment of the bulldozer described above, then it is necessary to raise the upper surface of the engine cover. If the upper surface of the engine cover is raised, then the region visible to the operator on the upper portion of the blade of the working implement becomes restricted, so that the workability is reduced.

Moreover, if these two or more exhaust treatment devices are disposed at the side of the engine, then the lateral width of the engine compartment becomes large, and the regions visible to the operator at the side portions of the blade of the working implement become restricted. Accordingly the workability is reduced with this type of configuration as well.

The aim of the present invention is to provide a bulldozer with which deterioration of the workability is prevented, even though two or more exhaust treatment devices are housed in the engine compartment.

The bulldozer according to a first aspect of the present invention comprises a blade, an engine, a first exhaust treatment device, a second exhaust treatment device, and an engine cover. The first exhaust treatment device and the second exhaust treatment device treat exhaust from the engine. The first exhaust treatment device is disposed in front of the engine and lower than the upper surface of the engine. The second exhaust treatment device is disposed above the engine. The engine cover includes an upper surface sloping forward and downward. The engine cover covers the engine, the first exhaust treatment device, and the second exhaust treatment device. Longitudinal directions of the first exhaust treatment device and the second exhaust treatment device extend along a vehicle lateral direction. As seen from the top of the vehicle, the second exhaust treatment device includes a portion that overlaps the engine. And, as seen from the side of the vehicle, a front edge of the second exhaust treatment device is positioned behind a rear edge of the first exhaust treatment device.

There may be further included a relay connection pipe which connects the first exhaust treatment device and the second exhaust treatment device and which is disposed over the first exhaust treatment device, and. An upper edge of the relay connection pipe may be positioned below an upper edge of the second exhaust treatment device.

The front edge of the second exhaust treatment device may be positioned behind a rear edge of the relay connection pipe.

As seen from the front of the vehicle, the second exhaust treatment device may include a portion that is overlapped over the relay connection pipe.

The second exhaust treatment device may be positioned forward of a center position of the engine in the front and rear direction.

The bulldozer described above may further comprise an air cleaner disposed higher than the engine and lower than the upper surface of the engine cover. The air cleaner may be positioned rearward of a center position of the engine in the front and rear direction.

A front edge of the relay connection pipe may be positioned rearward of the front edge of a first exhaust treatment device.

The engine cover may further include a front surface following along the first exhaust treatment device and the relay connection pipe, and a curved surface connecting the upper surface and the front surface smoothly.

An external diameter of the relay connection pipe may be shorter than an external diameter of the first exhaust treatment device and an external diameter of the second exhaust treatment device.

The bulldozer described above may further comprise a blade drive mechanism driving the blade. When the blade is raised by the blade drive mechanism to the maximum extent, the front surface of the engine cover may be positioned forward of and below a rear edge of the blade drive mechanism.

The bulldozer described above may further comprise a hydraulic pump disposed behind the engine.

The bulldozer described above may further comprise a cab disposed behind the engine and above the hydraulic pump.

An angle between a vertical direction and a straight line that joins a point indicating a central axial line of the first exhaust treatment device and a point indicating a central axial line of the relay connection pipe may be in the range between 0° and 20° inclusive. An angle between the vertical direction and a straight line that joins the point indicating the central axial line of the relay connection pipe and a point indicating a central axial line of the second exhaust treatment device may be in the range between 40° and 70° inclusive. An angle between the vertical direction and a straight line that joins the point indicating the central axial line of the first exhaust treatment device and the point indicating the central axial line of the second exhaust treatment device may be in the range between 10° and 40° inclusive.

The bulldozer described above may further comprise a mounting bracket, a first support bracket, and a second support bracket. The mounting bracket may be attached to the engine. The first support bracket may be attached to the mounting bracket, and may support the first exhaust treatment device. And the second support bracket may be attached to the mounting bracket, and may support the second exhaust treatment device.

The mounting bracket may include a lower attachment portion, an upper attachment portion, and a wall portion. The first support bracket may be attached to the lower attachment portion. The second support bracket may be attached to the upper attachment portion. And the wall portion may extend in the vertical direction from a rear end portion of the lower attachment portion to a front end portion of the upper attachment portion.

The mounting bracket may include a first connection portion, a second connection portion, and a third connection portion. The first connection portion may connect to a lower portion of the engine. The second connection portion may connect to an upper portion of the engine. The third connection portion may connect to an intermediate portion of the engine between the upper portion and the lower portion.

In the bulldozer according to the present invention, the first exhaust treatment device is disposed in front of the engine, while the second exhaust treatment device is disposed above the engine. And the longitudinal directions of the first exhaust treatment device and the second exhaust treatment device extend along the vehicle lateral direction. Moreover, as seen from the side of the vehicle, the front edge of the second exhaust treatment device is positioned behind the rear edge of the first exhaust treatment device. Due to this, even though the engine cover has the upper surface that slopes forward and downward, still it is possible to house the first exhaust treatment device and the second exhaust treatment device in the engine compartment without greatly raising the upper surface. As a result, it is possible to extend the region visible to the operator on the upper portion of the blade of the working implement, so that it is possible to prevent deterioration of the workability.

DETAILED DESCRIPTION OF EMBODIMENT(S)

Overall Structure

Figure 1:
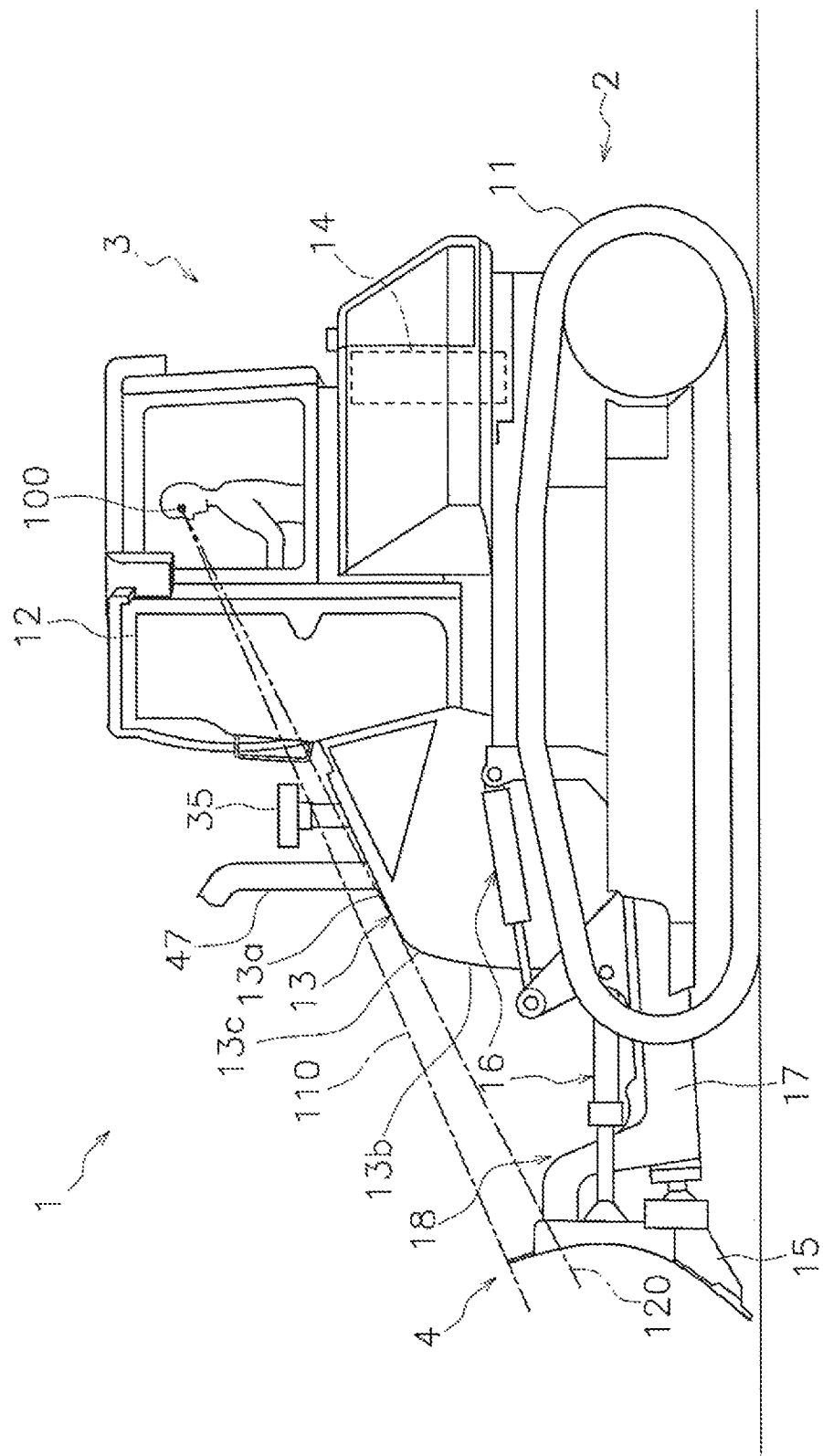
FIG. 1 is a left side view of a bulldozer according to an embodiment of the present invention.
Figure 2:
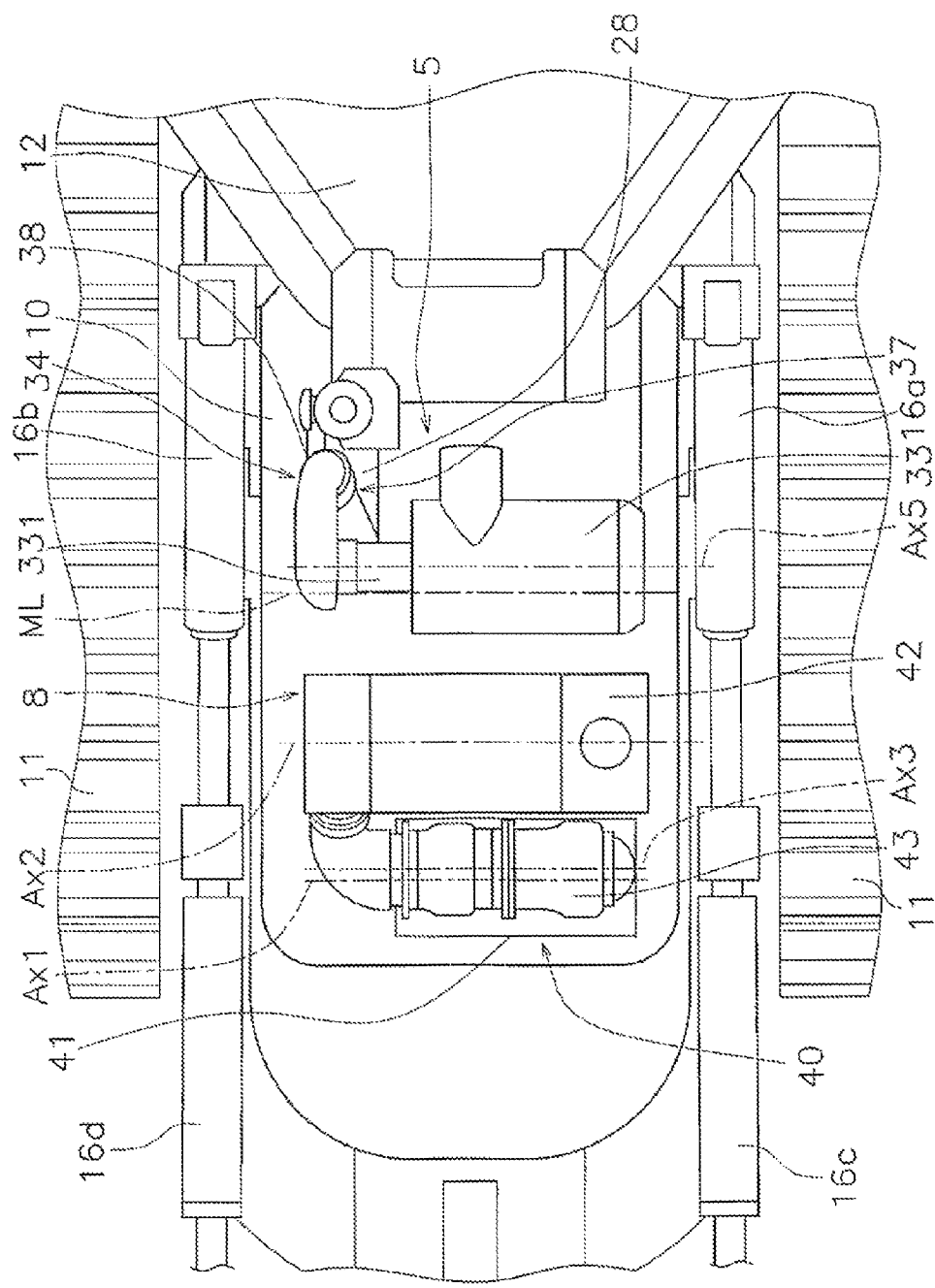
FIG. 2 is a top view illustrating a part of the bulldozer according to the embodiment of the present invention.

A left side view of a bulldozer 1 according to an embodiment of the present invention is shown in FIG. 1. And a top view illustrating a part of the bulldozer according to the embodiment of the present invention is shown in FIG. 2. In FIG. 2, an engine compartment 8 is illustrated in a state in which an engine cover 13, which will be described hereinafter, has been removed. It should be understood that, in the following explanation, "front and rear direction" means the front and rear direction of the bulldozer 1. To put it in other words, the front and rear direction means the front and rear direction as seen by an operator sitting in a cab (an operator compartment) 12. Moreover, the left/right direction means the left/right direction as seen by an operator sitting in the cab (the operator compartment). Furthermore, the lateral direction means the direction lateral to the vehicle, i.e. to the bulldozer 1; in other words, it means either one of the left direction and right direction described above.

The bulldozer 1 comprises a travelling unit 2, a main vehicle body 3, and a working implement 4. The travelling unit 2 is a device for driving the vehicle, and comprises crawler belts 11. The bulldozer 11 propels itself by driving the crawler belts 11.

The main vehicle body 3 comprises a vehicle body frame 10 (refer to FIG. 2), the cab 12, an engine cover 13, and a cooling device 14 (refer to FIG. 1). The engine cover 13 is disposed in front of the cab 12. An engine compartment 8 (refer to FIG. 2) in which an engine 5 is housed is positioned within the engine cover 13. The upper surface 13a of the engine cover 13 slopes upward towards the rear. The cooling device 14 is disposed behind the cab 12. It should be understood that, generally, with a bulldozer, the cooling device is disposed in front of the engine and within an engine cover that is in front of the cab. The cooling device 14 may, for example, include a radiator that cools the coolant of the engine 5, an oil cooler that cools hydraulic fluid, and a cooling fan that generates a flow of air.

The working implement 4 is provided in front of the engine cover 13. The working implement 4 includes a blade 15 and a blade drive mechanism 18. The central portion of the upper surface of the blade 15 protrudes more upward as compared to the left and right end portions thereof, and functions as a spill guard for protecting the hydraulic cylinders that are disposed at the rear side of the blade 15. The blade drive mechanism 18 drives the blade 15. The blade drive mechanism 18 includes hydraulic cylinders 16 and a blade support frame 17. The blade support frame 17 pivotally supports the blade 15. As illustrated in FIG. 2, the hydraulic cylinders 16 include a first cylinder 16a, a second cylinder 16b, a third cylinder 16c, and a fourth cylinder 16d. Both ends of the first cylinder 16a are rotatably connected to the blade support frame 17. Both ends of the second cylinder 16b are rotatably connected to the blade support frame 17. A first end of the third cylinder 16c is rotatably connected to the blade support frame 17. And a second end of the third cylinder 16c is connected to the blade 15. Moreover, a first end of the fourth cylinder 16d is rotatably connected to the blade support frame 17. And a second end of the fourth cylinder 16d is connected to the blade 15. The first cylinder 16a and the third cylinder 16c are disposed on the left side of the engine cover 13. And the second cylinder 16b and the fourth cylinder 16d are disposed on the right side of the engine cover 13. The first cylinder 16a and the second cylinder 16b move the blade 15 up and down. And the third cylinder 16c and the fourth cylinder 16d change the orientation of the blade 15. In other words, the first cylinder 16a through the fourth cylinder 16d control the position or the orientation of the blade 15.

Structures Internal to the Engine Compartment

Figure 3:
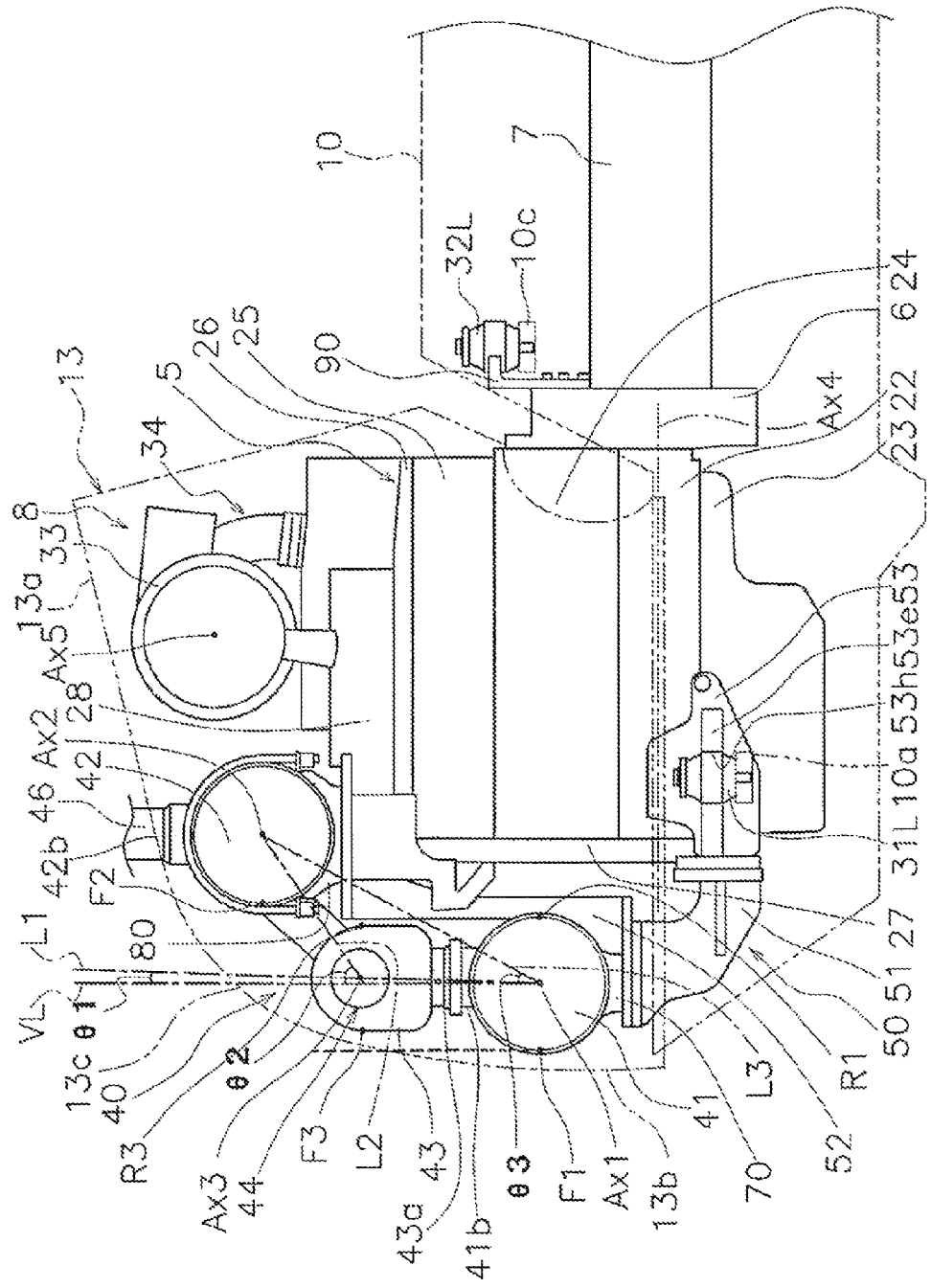
FIG. 3 is a left side view illustrating the internal structure of an engine compartment.
Figure 4:
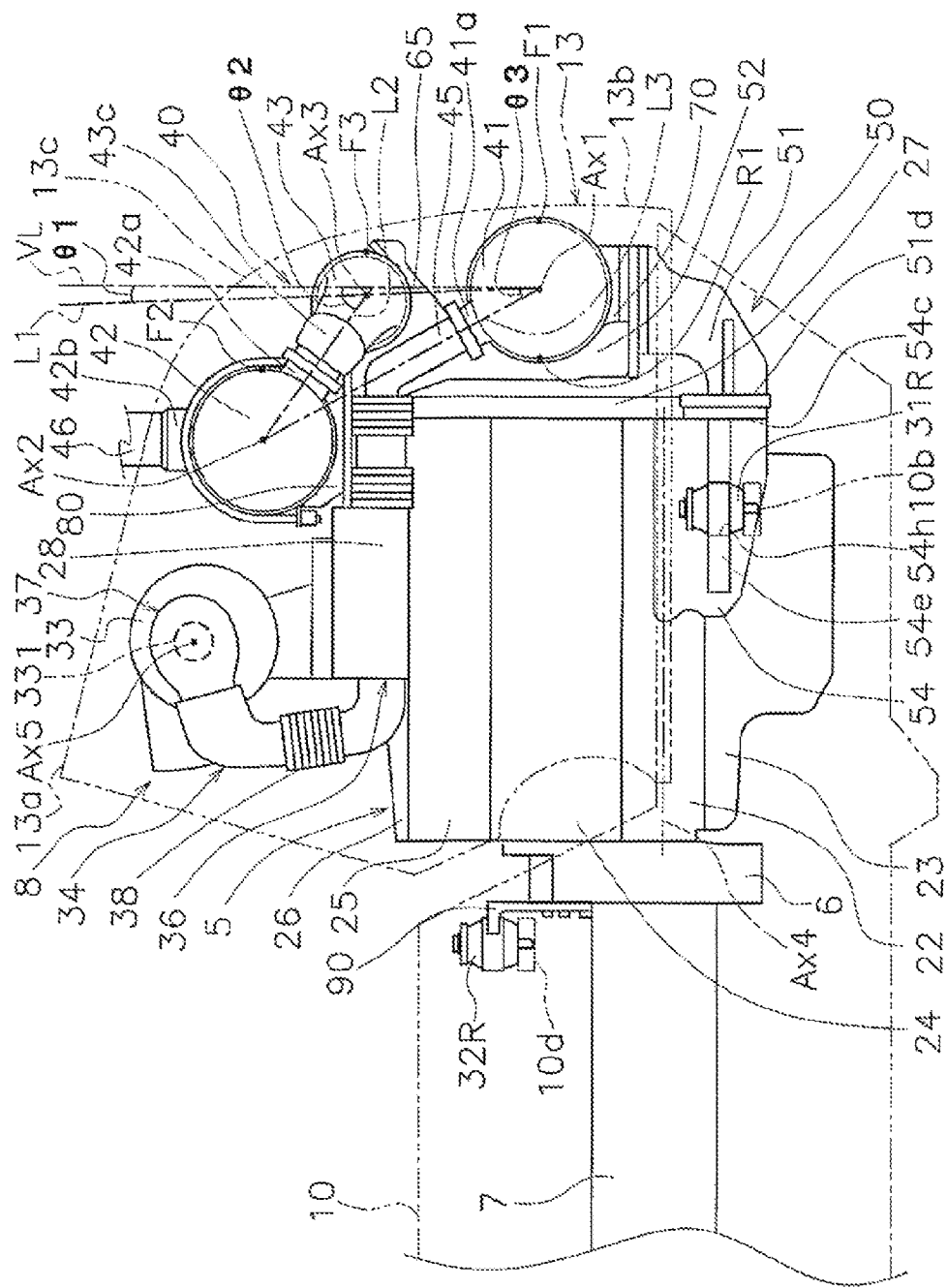
FIG. 4 is a right side view illustrating the internal structure of the engine compartment.
Figure 5:
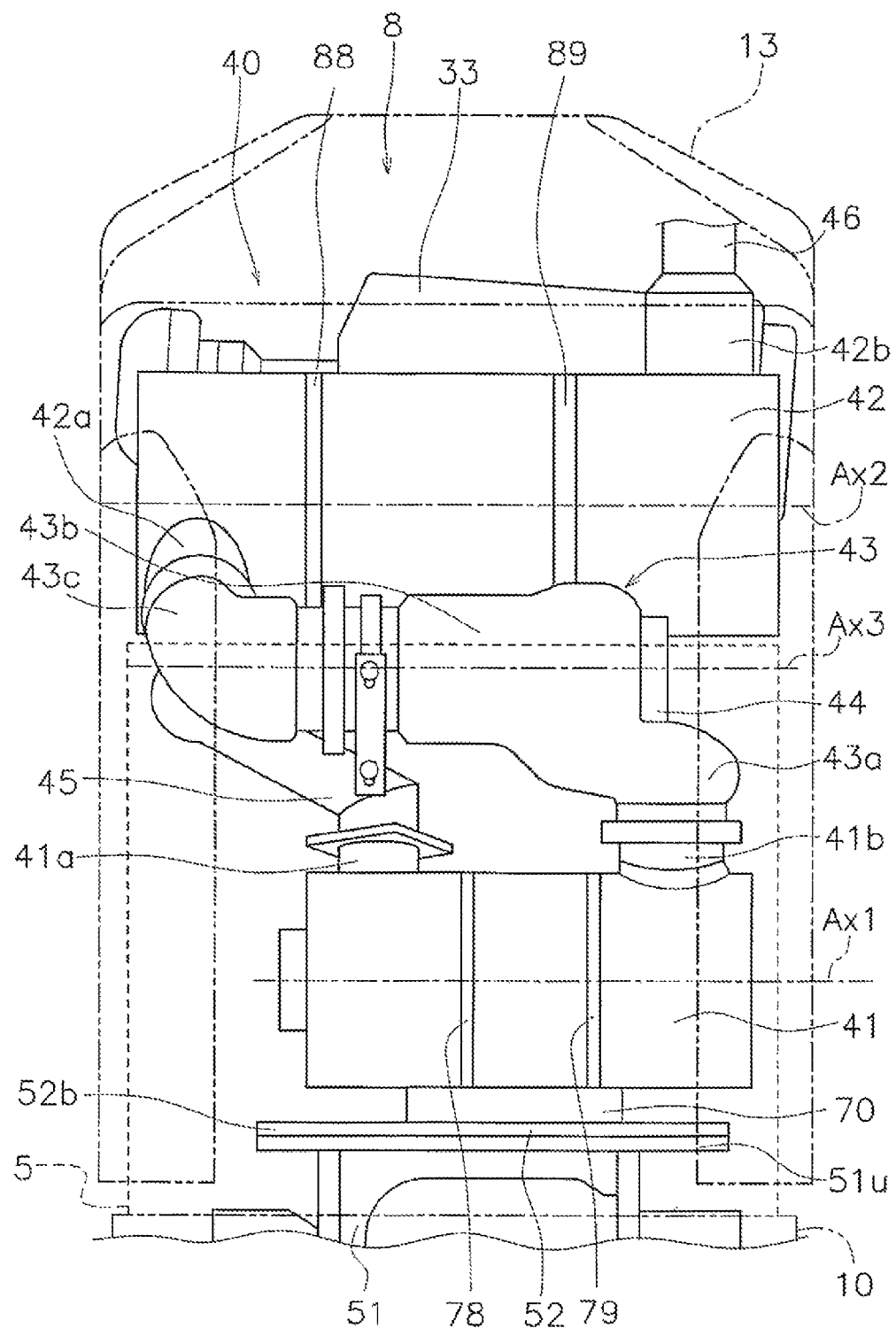
FIG. 5 is a front view illustrating the internal structure of the engine compartment.

FIG. 3 is a left side view illustrating the internal structure of the engine compartment 8 inside the engine cover 13. And FIG. 4 is a right side view illustrating the internal structure of the engine compartment 8 inside the engine cover 13. The right side of FIG. 4 represents the front of the vehicle. And FIG. 5 is a front view illustrating the internal structure of the engine compartment 8 inside the engine cover 13. It should be understood that, for ease of understanding, in FIGS. 3 and 4, the vehicle body frame 10 and the engine cover 13 are illustrated by chain double dashed lines. Moreover, in FIG. 5, the upper edge of the vehicle body frame 10 and the engine cover 13 that are adjacent to a mounting bracket 50, which will be described hereinafter, are illustrated by chain double dashed lines, and the schematic outline of the engine 5 is illustrated by dotted lines. Furthermore, in FIGS. 2 through 5, parts of the structures within the engine compartment 8 are omitted as appropriate. As shown in FIGS. 2 to 4, the main vehicle body 3 comprises the engine 5, a flywheel housing 6 and a hydraulic pump 7. The engine 5 is disposed within the engine cover 13.

The engine 5 is a diesel engine, and the output of the engine 5 is controlled by the amount of injection of fuel from a fuel injection pump (not shown in the drawings) being adjusted. The engine 5 comprises a crankcase 22, an oil pan 23, a cylinder body 24, a cylinder head 25, and a cylinder head cover 26. Moreover, the engine 5 includes a crankshaft (not shown in the drawings). The crankshaft extends in the front and rear direction of the vehicle. To put it in other words, the engine 5 is a so-called longitudinally disposed engine, and is arranged with its longitudinal dimension along the front and rear direction of the vehicle and its short dimension along the lateral direction of the vehicle. Since with this configuration the width of the vehicle can be narrowed, accordingly it is possible to secure visibility for the left and right lower ends of the blade 15, as is required for a bulldozer. A×4 in FIGS. 3 and 4 denotes the central axial line of the crankshaft. The crankcase 22 houses the crankshaft. A cam pulley (not shown in the drawings) is disposed in front of the crankcase 22. The crankshaft is connected to the cam pulley. As shown in FIGS. 3 and 4, a belt 27 passes around the cam pulley. The oil pan 23 is disposed below the crankcase 22. And the cylinder body 24 is disposed above the crankcase 22. Moreover, the cylinder head 25 is disposed above the cylinder body 24. And the cylinder head cover 26 is disposed above the cylinder head 25.

Furthermore, the engine 5 includes a supercharger 28. The supercharger 28 is connected to the cylinder head 25 via an exhaust conduit of the engine 5 (not illustrated in the drawings). In the top view of the vehicle, the supercharger 28 is disposed at the side of the cylinder head 25. And, as seen from the side of the vehicle, at least a part of the supercharger 28 is positioned above the upper surface of the engine 5, in other words is positioned higher than the upper surface of the cylinder head cover 26.

The flywheel housing 6 is disposed behind the engine 5. And the hydraulic pump 7 is disposed behind the flywheel housing 6, and is attached to the flywheel housing 6. In other words, the hydraulic pump 7 is disposed behind the engine 5. The hydraulic pump 7 is linked to the output shaft of the engine 5 via the flywheel. The hydraulic pump 7 is driven to discharge hydraulic fluid by the drive force from the engine 5. The cab 12 is disposed directly above the hydraulic pump 7. In other words, the cab 12 is disposed behind the engine 5 and also above the hydraulic pump 7.

The main vehicle body 3 includes an air cleaner 33 and a duct 34. The air cleaner 33 and the duct 34 are positioned tower than the upper surface 13a of the engine cover 13. The air cleaner 33 is disposed over the engine 5. The air cleaner 33 is fixed to the engine cover 13. The air cleaner 33 is cylindrical in shape. The central axial line A×5 of the air cleaner 33 shown in FIG. 2 is disposed approximately horizontally, so as to extend along the vehicle lateral direction. Moreover, the air cleaner 33 is positioned behind the central position ML of the engine 5 in the forward and rear direction of the vehicle. Specifically, the central axis A×5 of the air cleaner 33 is positioned behind the central position ML of the engine 5 in the vehicle forward and rear direction. The air cleaner 33 has an intake port (not shown in the drawings) and an exhaust port 331 (refer to FIGS. 2 and 4). The intake port is connected to a head portion 35 (refer to FIG. 1) via a pipe member not shown in the figures. The head portion 35 protrudes upward from the upper surface of the engine cover 13. The exhaust pot 331 is provided on the side of the air cleaner 33. The exhaust port 331 is positioned higher than the supercharger 28 described above.

The duct 34 connects the air cleaner 33 and the engine 5. The duct 34 extends downwards from the exhaust port 331 of the air cleaner 33, and has a shape that is curved towards the supercharger 28. As shown in FIG. 4, the duct 34 includes a first connection portion 36, a second connection portion 37, and a vibration absorption portion 38. The first connection portion 36 is connected to the engine 5. Specifically, the first connection portion 36 is connected to the supercharger 28. The second connection portion 37 is connected to the air cleaner 33. The second connection portion 37 is connected to the exhaust port 331 of the air cleaner 33. And, in the duct 34, the vibration absorption portion 38 is positioned between the first connection portion 36 and the second connection portion 37. The vibration absorption portion 38 has the form of a bellows.

Structure of the Exhaust Treatment Devices

The main vehicle body 3 includes a first exhaust treatment device 41, a second exhaust treatment device 42, a relay connection pipe 43, a first connection pipe 45, and a second connection pipe 46. The first exhaust treatment device 41, the second exhaust treatment device 42, and the relay connection pipe 43 will be collectively referred to as an exhaust treatment assembly 40. The first connection pipe 45 connects the engine 5 and the first exhaust treatment device 41. In more detail, the first connection pipe 45 connects together the aforementioned supercharger 28 and the first exhaust treatment device 41. And the second connection pipe 46 connects to the second exhaust treatment device 42, and discharges exhaust from the engine 5 that has been treated by the second exhaust treatment device 42. The second connection pipe 46 is connected to an exhaust pipe 47 which is illustrated in FIG. 1. The exhaust pipe 47 is arranged so as to protrude upwards from the engine cover 13.

In this embodiment, the first exhaust treatment device may, for example, be a diesel oxidation catalyst (DOC) device, and treats exhaust from the engine 5 which is fed via the first connection pipe 45. By oxidation, the first exhaust treatment device 41 eliminates hydrocarbons (HC), carbon monoxide (CO), and soluble organic components (SOP) included in the exhaust.

As shown in FIGS. 3 and 4, the first exhaust treatment device 41 is disposed in front of the engine 5, and at the foremost position within the engine cover 13. Locating the cooling device 14 behind the cab 12 rather than within the engine compartment 8 enables this type of arrangement. Moreover, the first exhaust treatment device 41 is disposed lower than the upper surface of the engine 5. Specifically, the first exhaust treatment device 41 is disposed lower than the upper surface of the cylinder head cover 26. Also, the first exhaust treatment device 41 is disposed higher than the bottom surface of the oil pan 23.

As shown, in FIGS. 3 to 5, the first exhaust treatment device 41 has a generally cylindrical external shape. The dimension of the first exhaust treatment device 41 in the vehicle lateral direction is smaller than that of the engine 5 in the vehicle lateral direction. Moreover, the dimension of the first exhaust treatment device 41 in the vehicle lateral direction is smaller than that of the second exhaust treatment device 42 in the vehicle lateral direction. As shown in FIG. 5, the first exhaust treatment device 41 is arranged so that its central axial line Ax1 extends along the vehicle lateral direction. In other words, the longitudinal direction of the first exhaust treatment device 41 extends along the vehicle lateral direction. Furthermore, the first exhaust treatment device 41 includes a part that is overlapped over the engine 5, as seen from the front of the vehicle.

As shown in FIGS. 3 to 5, the first exhaust treatment device 41 includes a first connection port 41a and a second connection port 41b. As shown in FIGS. 4 and 5, the first connection pipe 45 is connected to the first connection port 41a. And, as shown in FIGS. 3 and 5, the relay connection pipe 43 is connected to the second connection port 41b.

As shown in FIG. 4, the first connection port 41a protrudes obliquely upward. Specifically, the first connection port 41a protrudes upward and moreover obliquely toward the engine 5. Correspondingly, the first connection pipe 45 extends obliquely downward toward the first exhaust treatment device 41 from the position where it is connected to the engine 5. Due to this, the first exhaust treatment device 41 is disposed at a position such that it does not overlap the engine 5 in a top view. In other words, at least one of the first exhaust treatment device 41 and the second exhaust treatment device 42 is disposed at a position such that it does not overlap the engine 5 in a top view.

As shown in FIG. 3, the second connection port 41b is sloped slightly backward from the vertical direction. Due to this, as shown in FIG. 2, the central axial line Ax3 of a straight line portion 43b (to be described in detail hereinafter) of the relay connection pipe 43 is positioned, in a top view, a little behind the central axial line Ax1.

The relay connection pipe 43 connects the first exhaust treatment device 41 and the second exhaust treatment device 42. As shown in FIGS. 3 and 5, the external diameter of the relay connection pipe 43 is smaller than the external diameter of the first exhaust treatment device 41 and the external diameter of the second exhaust treatment device 42. A first end of the relay connection pipe 43 is connected to the second connection port 41b of the first exhaust treatment device 41. And a second end of the relay connection pipe 43, which is opposite to the first end of the relay connection pipe 43, is connected to a third connection port 42a of the second exhaust treatment device 42. The relay connection pipe 43 is disposed in front of the engine 5, and moreover above the first exhaust treatment device 41. Furthermore, as shown in FIG. 5, as seen from the front of the vehicle, the relay connection pipe 43 includes a part that is overlapped over the engine 5. And, as seen from the front of the vehicle, the relay connection pipe 43 is overlapped over a part of the first connection pipe 45. Moreover, as shown in FIG. 4, the relay connection pipe 43 passes through a position close to the first connection pipe 45.

As shown in FIG. 5, the relay connection pipe 43 includes a first curved portion 43a, a straight line portion 43b, and a second curved portion 43c. The straight line portion 43b is positioned above the first exhaust treatment device 41. As shown in FIGS. 2 and 5, the straight line portion 43b is arranged so that its central axial line Ax3 extends along the vehicle lateral direction. In other words, the straight line portion 43b is arranged so that its central axial line Ax3 is parallel to the central axial line Ax1 of the first exhaust treatment device 41. To express this in another way, the longitudinal direction of the relay connection pipe 43 extends along the vehicle lateral direction. The first curved portion 43a couples together the straight line portion 43b and the second connection port 41b. And the second curved portion 43c couples together the straight line portion 43b and the third connection port 42a of the second exhaust treatment device 42. An injector 44 is attached in the first curved portion 43a. The injector 44 injects a reducing agent into the interior of the relay connection pipe 43. The reducing agent may, for example, be aqueous urea.

In this embodiment, as an example, the second exhaust treatment device 42 is a selective catalytic reduction device. The second exhaust treatment device 42 treats the exhaust from the engine 5 which has been treated by the first exhaust treatment device 41. The second exhaust treatment device 42 selectively reduces nitrogen oxides (NOx).

The second exhaust treatment device 42 has a generally cylindrical external shape. As shown in FIGS. 3 through 5, the second exhaust treatment device 42 is disposed above the engine 5. As shown in FIG. 5, the second exhaust treatment device 42 is arranged so that its central axial line Ax2 extends along the vehicle lateral direction. Moreover, the second exhaust treatment device 42 is arranged so that its central axial line Ax2 is parallel to the central axial line Ax1 of the first exhaust treatment device 41. In other words, the longitudinal direction of the second exhaust treatment device 42 extends along the vehicle lateral direction. Furthermore, the second exhaust treatment device 42 is disposed so that the central axial line Ax2 of the second exhaust treatment device 42 is above the upper edge of the relay connection pipe 43. In other words, the upper edge of the relay connection pipe 43 is positioned below the upper edge of the second exhaust treatment device 42. Accordingly, the first exhaust treatment device 41, the relay connection pipe 43, and the second exhaust treatment device 42 are arranged in a vertical series. Moreover, as seen from the front of the vehicle, the second exhaust treatment device 42 includes a portion that is overlapped over the relay connection pipe 43.

Furthermore, as shown in FIG. 2, the second exhaust treatment device 42 is arranged so as to overlap a part of the engine 5 in a top view. In other words, as seen from the top of the vehicle, the second exhaust treatment device 42 has a part that is overlapped over the engine 5. In more detail, as shown in FIGS. 3 and 4, the second exhaust treatment device 42 is disposed so as to overlap the belt 27 of the engine 5 in a top view. The second exhaust treatment device 42 is positioned in front of the center position ML of the engine 5 in the vehicle front and rear direction. Specifically, the rear edge of the second exhaust treatment device 42 is positioned in front of the center position ML of the engine 5 in the vehicle front and rear direction.

Here, referring to FIGS. 3 and 4, as seen from the side of the vehicle, the front edge F2 of the second exhaust treatment device 42 is positioned behind the rear edge R1 of the first exhaust treatment device 41. Moreover, as seen from the side of the vehicle, the front edge F2 of the second exhaust treatment device 42 is positioned behind the rear edge of the relay connection pipe 43. Furthermore, a dotted line in FIGS. 3 and 4 indicates a straight line along the vertical direction through the front edge F1 of the first exhaust treatment device 41. According to this, as seen from the side of the vehicle, the front edge F3 of the relay connection pipe 43 is positioned behind the front edge F1 of the first exhaust treatment device 41. To express this in another way, the dot showing the central axial line A×3 of the relay connection pipe 43 is positioned behind the dot showing the central axial line A×1 of the first exhaust treatment device 41.

FIGS. 3 and 4 show straight lines VL, L1, L2, and L3 as one dot chain lines. The straight line VL is a straight line passing through the dot indicating the central axial line A×1 of the first exhaust treatment device 41, and extending in the vertical direction. The straight line L1 is a straight line that connects the dot indicating the central axial line A×1 of the first exhaust treatment device 41 and the dot indicating the central axial line A×3 of the relay connection pipe 43. The straight line L2 is a straight line that connects the dot indicating the central axial line A×3 of the relay connection pipe 43 and the dot indicating the central axial line A×2 of the second exhaust treatment device 42. And the straight line L3 is a straight line that connects the dot indicating the central axial line A×1 of the first exhaust treatment device 41 and the dot indicating the central axial line A×2 of the second exhaust treatment device 42. The straight line L1 is inclined rearward with respect to the straight line VL by just θ1. And this angle θ1 between the straight line VL and the straight line L1 is within the range from 0° to 20° inclusive. In other words, as seen from the side of the vehicle, the angle between the vertical direction and the straight line that joins the dot indicating the central axial line A×1 of the first exhaust treatment device 41 and the dot indicating the central axial line A×3 of the relay connection pipe 43 is within the range from 0° to 20° inclusive. And the straight line L2 is inclined rearward with respect to the straight line VL by just θ2. This angle θ2 between the straight line VL and the straight line L2 is within the range from 40° to 70° inclusive. In other words, as seen from the side of the vehicle, the angle between the vertical direction and the straight line that joins the dot indicating the central axial line A×3 of the relay connection pipe 43 and the dot indicating the central axial line A×2 of the second exhaust treatment device 42 is within the range front 40° to 70° inclusive. Yet further, the straight line L3 is inclined rearward with respect to the straight line VL by just θ3. This angle θ3 between the straight line VL and the straight line L3 is within the range from 10° to 40° inclusive. In other words, as seen from the side of the vehicle, the angle between the vertical direction and the straight line that joins the dot indicating the central axial line A×1 of the first exhaust treatment device 41 and the dot indicating the central axial line A×2 of the second exhaust treatment device 42 is within the range from 10° to 40° inclusive.

As shown in FIGS. 4 and 5, the second exhaust treatment device 42 includes a third connection port 42a and a fourth connection port 42b. The relay connection pipe 43 is connected to the third connection port 42a. And the second connection pipe 46 is connected to the fourth connection port 42b. In other words, the second connection pipe 46 is connected to the second exhaust treatment device 42.

The third connection port 42a is inclined forward and downward from the horizontal direction. And the fourth connection port 42b projects directly above. Due to this, the second connection pipe 46 projects upward above the engine 5. The upper portion of the second connection pipe 46 projects upward from the engine cover 13.

The engine 5, the first connection pipe 45, the first exhaust treatment device 41, the relay connection pipe 43, the second exhaust treatment device 42, the second connection pipe 46, and the exhaust conduit 47 are connected in series in that order. Accordingly, the exhaust from the engine 5 passes through the first connection pipe 45 and is fed into the first exhaust treatment device 41. HC, CO, and SOF in the exhaust are mostly reduced by the first exhaust treatment device 41. Next, the exhaust passes through the relay connection pipe 43, and is fed into the second exhaust treatment device 42. NOx in the exhaust is mostly reduced by the second exhaust treatment device 42. And thereafter the cleaned exhaust passes through the second connection pipe 46 and the exhaust pipe 47, and is discharged to the exterior.

Positional relationship of the exhaust treatment devices, the air cleaner, and the engine, and the shape of the engine cover.

As shown in FIGS. 2 through 4, the first exhaust treatment device 41, the relay connection pipe 43, the second exhaust treatment device 42, and the air cleaner 33 are arranged so as to surround the front and the top of the engine 5. Therefore, it is possible to arrange the first exhaust treatment device 41, the relay connection pipe 43, the second exhaust treatment device 42, and the air cleaner 33 tightly close to one another.

Next, correspondence between the positions of the exhaust treatment devices and the air cleaner 33 and so on, and the shape of the engine cover 13, will be explained. As shown in FIGS. 3 through 5, the engine cover 13 covers the engine 5, the air cleaner 33, the first exhaust treatment device 41, the second exhaust treatment device 42, the relay connection pipe 43, and the injector 44. And, as shown in FIGS. 3 and 4, the upper surface 13a of the engine cover 13 extends along the second exhaust treatment device 42 and the air cleaner 33. The front surface 13b of the engine cover 13 extends along the first exhaust treatment device 41 and the relay connection pipe 43. The engine cover 13 also includes a curved surface 13c that smoothly connects together its upper surface 13a and its front surface 13b. Due to the provision of the curved surface 13c, the region of the upper portion of the blade 15 which the operator is able to check visually is extended.

FIG. 1 illustrates the details of this situation. FIG. 1 illustrates the region of the upper portion of the blade 15 which can be visually checked from the point of view 100 of an operator who is sitting in the cab 12, as the region between straight lines 110 and 120. The point of view 100 corresponds to the position of a filament position center point (FPCP) as defined in the specification of ISO 5006. The point of view 100 is a point that is just 680 mm upward in the vertical direction from the seat index point (SIP) as defined in the specification of ISO 5006. The straight line 110 is the straight line joining the point of view 100 and the upper edge of the blade 15. And the straight line 120 is the straight line passing through the point of view 100 and contacting the engine cover 13.

In FIG. 1, the straight line 120 is tangent to the curved surface 13c, and it will be understood that provision of the curved surface 13c causes the region of the upper portion of the blade 15 which the operator is able to check visually to be extended. Moreover, as shown in FIG. 1, as seen from the side of the vehicle, the straight line that joins the point of view 100 and the upper edge of the blade 15 is positioned higher than the engine cover 13.

Figure 6:
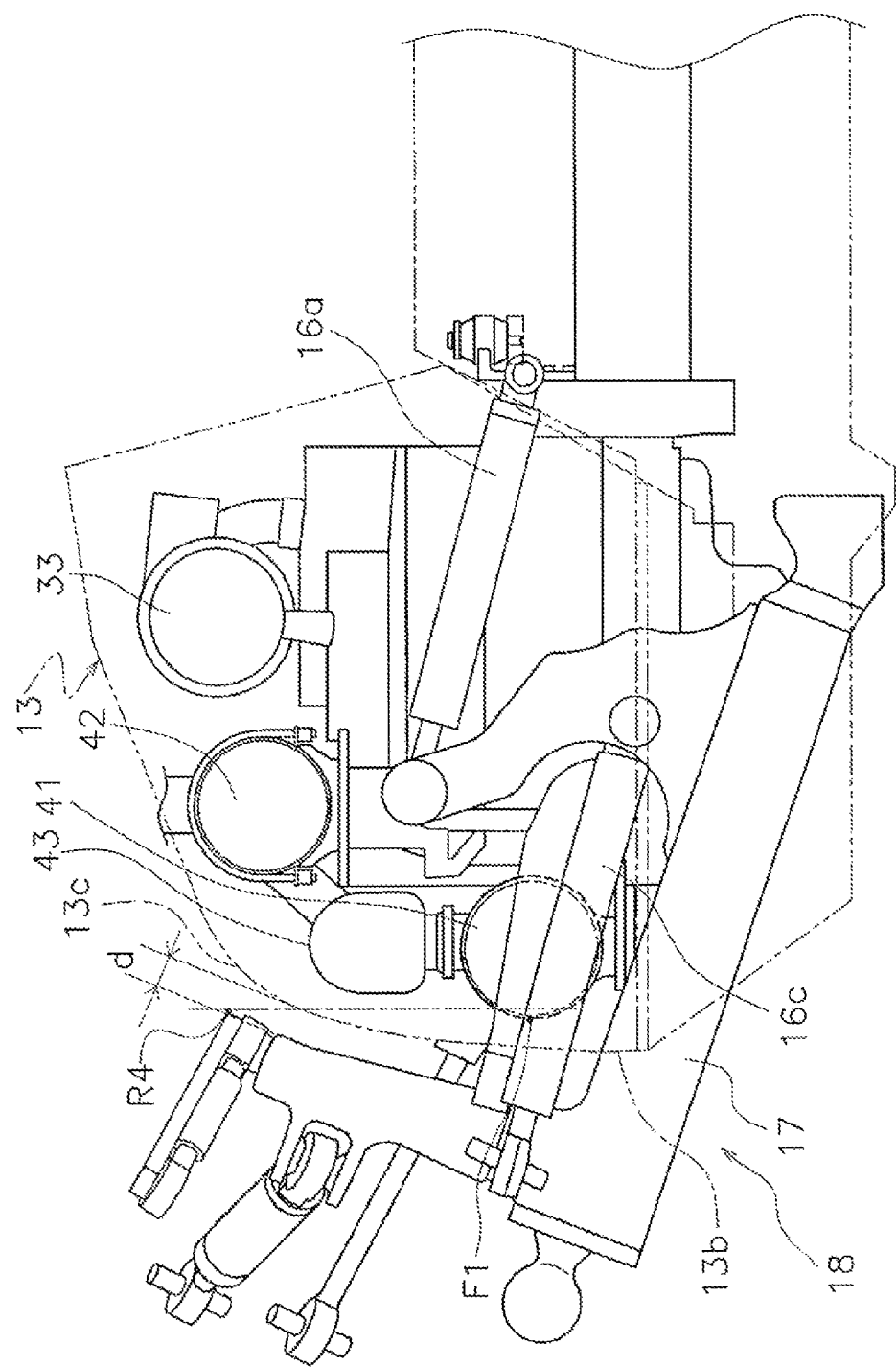
FIG. 6 is a left side view illustrating the positional relationship between a blade drive mechanism, an exhaust treatment assembly, and an engine cover when the blade is raised.

FIG. 6 is a left side view illustrating the positional relationship between the blade drive mechanism 18, the exhaust treatment assembly 40, and the engine cover 13 when the blade 15 is raised. In FIG. 6, the blade 15 is not illustrated. As shown in FIG. 6, due to the curved surface 13c being provided to the engine cover 13, the blade drive mechanism 18 is separated from the engine cover by at least the distance d, even when the blade 15 is raised. The distance d is a margin that is provided so as to ensure that the blade drive mechanism 18 does not collide with the engine cover 13. An imaginary line that passes through the rear edge R4 of the blade drive mechanism when the blade 15 is raised by the blade drive mechanism 18 to the greatest possible extent and that extends vertically is shown in FIG. 6 by a one dot chain line. According to this, when the blade 15 is raised by the blade drive mechanism 18 to the greatest possible extent, the front surface 13b of the engine cover 13 is positioned forward and below the rear edge R4 of the blade drive mechanism. Furthermore, the front edge F1 of the first exhaust treatment device 41 is also positioned forward and below the rear edge R4 of the blade drive mechanism 18.

Structure of the brackets that support the exhaust treatment devices, etc.

As shown in FIGS. 3 and 4, the main vehicle body 3 includes a mounting bracket 50, a first support bracket 70, a second support bracket 80, a rear mounting bracket 90, and dampers 31L, 31R, 32L, and 32R. The mounting bracket 50 includes a lower mounting bracket 51, an upper mounting bracket 52, a left mounting bracket 53, and a right mounting bracket 54. The mounting bracket 50 is disposed within the engine compartment 8. The left mounting bracket 53, the right mounting bracket 54, and the rear mounting bracket 90 support the engine upon the vehicle body frame 10 via the dampers 31L, 31R, 32L, and 32R.

The mounting bracket 50 is attached to the engine 5. Specifically, the left mounting bracket 53 and the right mounting bracket 54 are attached to the engine 5. The lower mounting bracket 51 is attached to the left mounting bracket 53 and to the right mounting bracket 54. The lower mounting bracket 51 supports the first support bracket 70 and the upper mounting bracket 52. And the upper mounting bracket 52 supports the second support bracket 80. The first support bracket 70 is attached to the mounting bracket 50, and directly supports the first exhaust treatment device 41. And the second support bracket 80 is attached to the mounting bracket 50, and directly supports the second exhaust treatment device 42.

Figure 7:
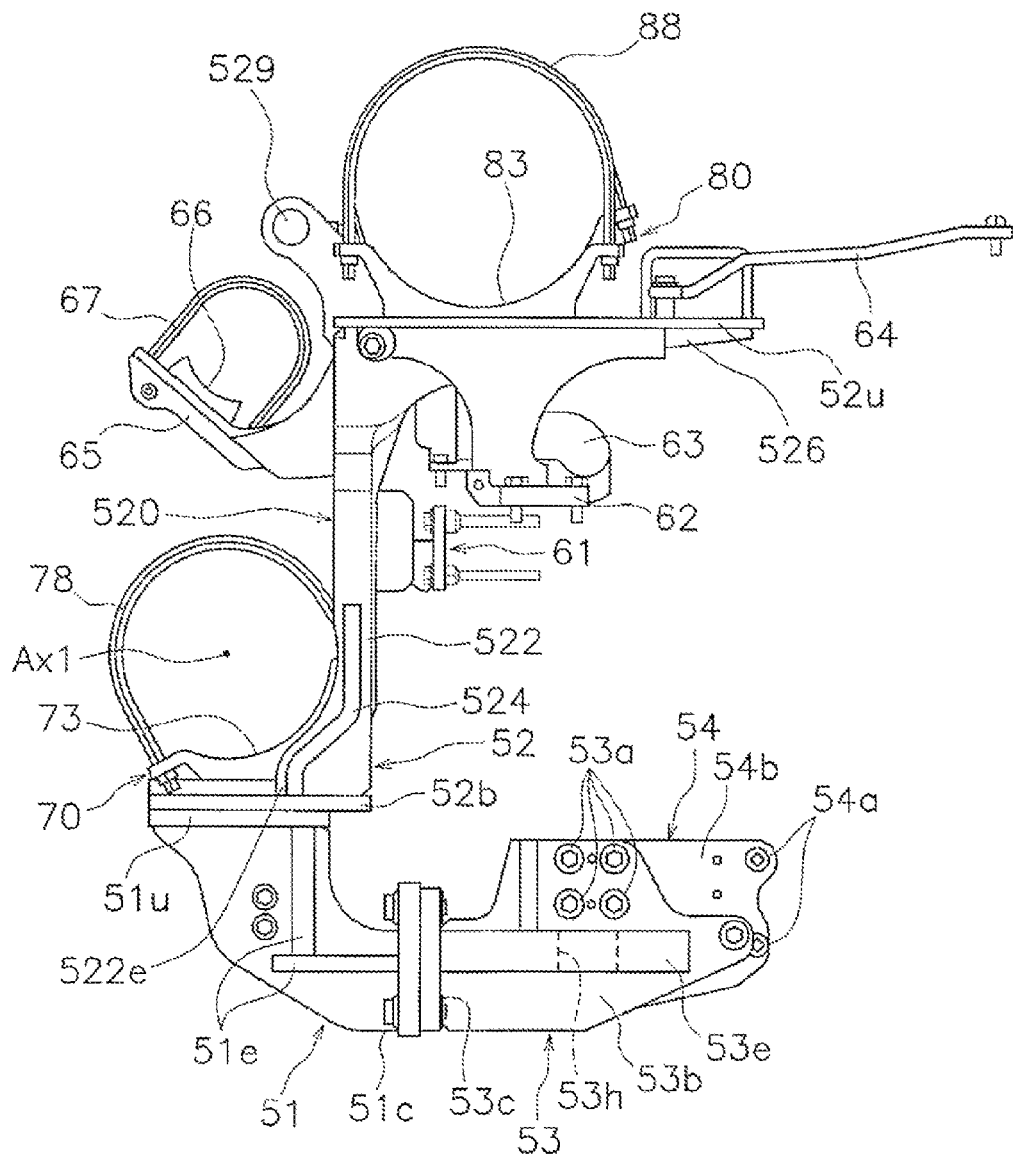
FIG. 7 is a left side view of a mounting bracket, a first support bracket, and a second support bracket.

FIG. 7 is a left side view of the mounting bracket 50, the first support bracket 70, and the second support bracket 80. Referring to FIGS. 3 and 7, the left mounting bracket 53 comprises a left mounting bracket base portion 53b, a left mounting bracket attachment portion 53a, a left mounting bracket protruding portion 53e, and a left mounting bracket connection portion 53c. The left mounting bracket base portion 53b is a flat plate shaped member that extends approximately parallel to the left side of the engine 5. The left mounting bracket attachment portion 53a has, for example, a through hole for passing a bolt. And, in a position corresponding to the left mounting bracket attachment portion 53a, the engine 5 has a screw hole into which a bolt can be screwed and engaged. The left mounting bracket 53 is attached to the engine 5 by a bolt being passed through the left mounting bracket attachment portion 53a, and by this bolt being screwingly engaged in the screw hole mentioned above. The left mounting bracket 53 is attached to the engine 5 in this manner via the left mounting bracket attachment portion 53a. The left mounting bracket protruding portion 53e is a member that protrudes in the leftward direction from the left mounting bracket base portion 53b. The left mounting bracket protruding portion 53e has a left fixing hole 53h. As shown in FIG. 3, the damper 31L is attached in the left fixing hole 53h. The damper 31L is supported by the mounting bracket support portion 10a of the vehicle body frame 10.

The right mounting bracket 64 is built to be approximately symmetric with the left mounting bracket 53. Referring to FIGS. 4 and 7, the right mounting bracket 54 includes a right mounting bracket base portion 54b, a right mounting bracket attachment portion 54a, a right mounting bracket protruding portion 54e, and a right mounting bracket connection portion 54c. The right mounting bracket base portion 54b is a flat plate shaped member that extends approximately parallel to the right side of the engine 5. The right mounting bracket attachment portion 54a includes, for example, a through hole for passing a bolt. And, in a position corresponding to the right mounting bracket attachment portion 54a, the engine 5 has a screw hole into which a bolt can be screwed and engaged. The right mounting bracket 54 is attached to the engine 5 by a bolt being passed through the right mounting bracket attachment portion 54a, and by this bolt being screwingly engaged in the screw hole mentioned above. The right mounting bracket 54 is attached to the engine 54 in this manner via the right mounting bracket attachment portion 54a. The right mounting bracket protruding portion 54e is a member that protrudes in the rightward direction from the right mounting bracket base portion 54b. The right mounting bracket protruding portion 54e includes a right fixing hole 54h. As shown in FIG. 4, the damper 31R is attached in the right fixing hole 54h. The damper 31R is supported by the mounting bracket support portion 10b of the vehicle body frame 10.

Accordingly, the mounting bracket 50 is attached to the vehicle body frame 10 via the clampers 31L and 31R. The dampers 31L and 31R internally include elastic members made front rubber or the like. Consequently, the mounting bracket 50 is elastically supported via the dampers 31L and 31R upon the mounting bracket support portions 10a and 10b of the vehicle body frame 10. Moreover, the left fixing hole 53h and the right fixing hole 54h are arranged so as to be mutually separated along the vehicle lateral direction. In other words, the dampers 31L and 31R are arranged so as to be mutually separated along the vehicle lateral direction.

Moreover the left mounting bracket attachment portion 53a and the right mounting bracket attachment portion 54a are herein collectively termed the "first connection portion". Then, the mounting bracket 50 includes this first connection portion. The first connection portion is connected to the lower portion of the engine 5. The lower portion of the engine 5 may, for example, be the portion of the engine 5 that is lower than the cylinder body 24. The engine 5 is elastically supported upon the vehicle body frame 10 via the mounting bracket 50 and the dampers 31L and 31R.

Referring to FIGS. 3 and 7, the left mounting bracket connection portion 53c is connected to the lower mounting bracket left connection portion 51c of the lower mounting bracket 51. In the example of FIG. 7, the lower mounting bracket left connection portion 51c includes a through hole for passing a bolt, and the left mounting bracket connection portion 53c includes a screw hole into which a bolt can be screwed and engaged. And the lower mounting bracket 51 is attached to the left mounting bracket 53 by a bolt being passed through the lower mounting bracket left connection portion 51c, and by this bolt being screwed into and engaged in the screw hole described above.

Referring to FIG. 4, the right mounting bracket connection portion 54c is connected to the lower mounting bracket right connection portion 51d of the lower mounting bracket 51. The lower mounting bracket right connection portion 51*d* includes, for example, a through hole for passing a bolt, and the right mounting bracket connection portion 54*c* includes a screw hole into which a bolt can be screwed and engaged. And the lower mounting bracket 51 is attached to the right mounting bracket 54 by a bolt being passed through the lower mounting bracket right connection portion 51*d*, and by this bolt being screwed into and engaged in the screw hole described above.

Figure 8:
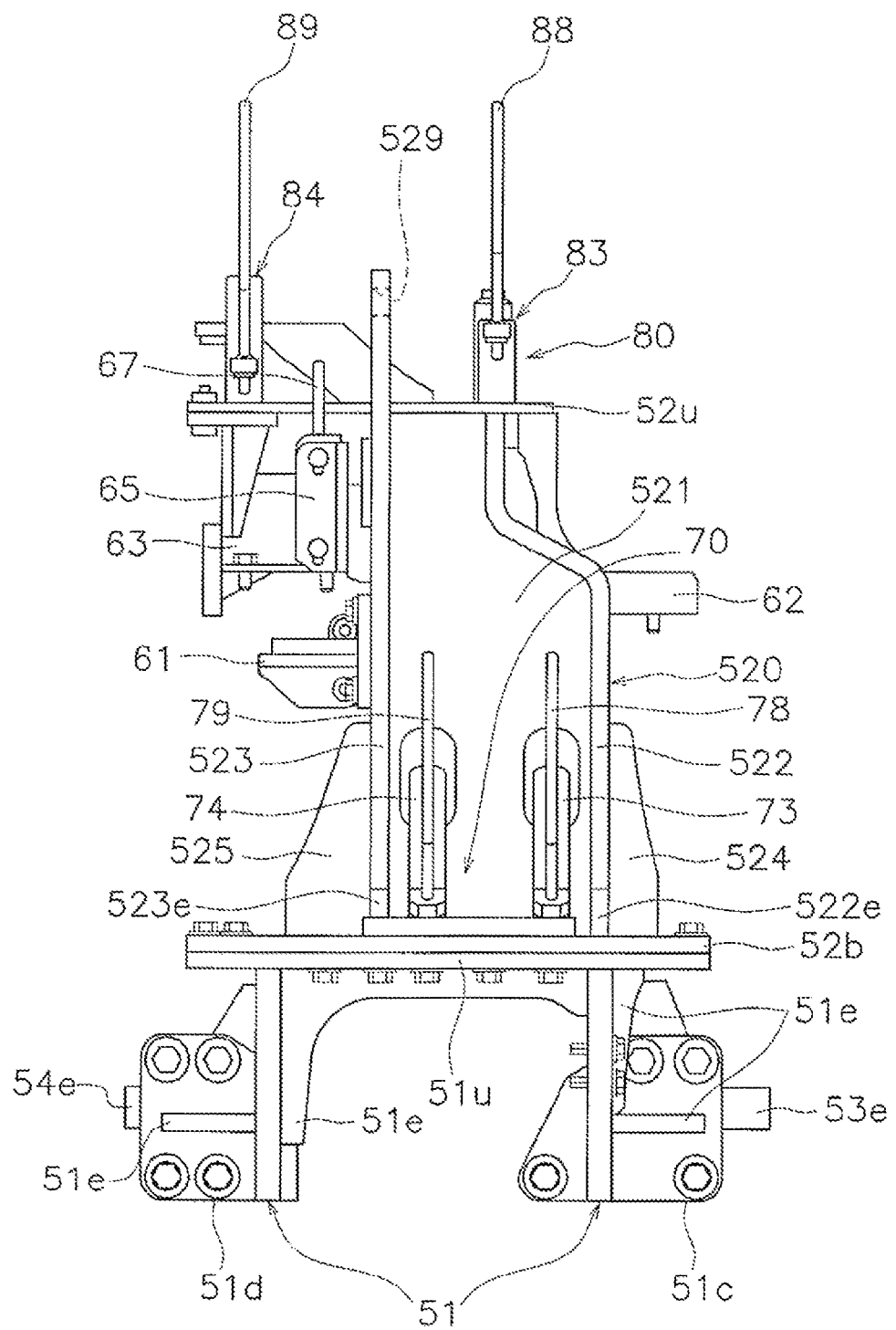
FIG. 8 is a front view of the mounting bracket, the first support bracket, and the second support bracket.

FIG. 8 is a front view of the mounting bracket 50, the first support bracket 70, and the second support bracket 80. As shown in FIGS. 7 and 8, the lower mounting bracket 51 extends from the lower mounting bracket left connection portion 51*c* and the lower mounting bracket right connection portion 51*d* in the direction away from the left mounting bracket 53 and the right mounting bracket 54 (i.e. the forward direction, when installed to the bulldozer 1) and moreover in the upward direction. In addition to the lower mounting bracket left connection portion 51*c* and the lower mounting bracket right connection portion 51*d*, the lower mounting bracket 51 includes a plurality of reinforcement plates 51*e* and an upper surface 51*u*. A lower attachment portion 52*b* of the upper mounting bracket 52 is attached to the upper surface 51*u*. In the example shown in FIG. 8, the upper surface 51*u* and the lower attachment portion 52*b* are fixed together by a plurality of screws.

Referring to FIGS. 7 and 8, the upper mounting bracket 52 comprises the lower attachment portion 52*b*, an upper attachment portion 52*u*, and a wall portion 520. The lower attachment portion 52*b* is a flat plate shaped member. The length of the lower attachment portion 52*b* in the forward and rear direction is almost equal to the length of the diameter of the first exhaust treatment device 41. Moreover, referring to FIG. 5, the length of the lower attachment portion 52*b* in the lateral direction is almost equal to the length of the first exhaust treatment device 41 in the direction of its central axis Ax1. The lower attachment portion 52*b* is attached to the lower mounting bracket 51. Furthermore, the first support bracket 70 is attached to the lower attachment portion 52*b*. The lower attachment portion 52*b*, the upper surface 51*u* of the lower mounting bracket 51, and the first support bracket 70 include through holes for insertion of bolts, and screw holes that are provided in positions corresponding to the through holes. The lower attachment portion 52*b*, the upper surface 51*u* of the lower mounting bracket 51, and the first support bracket 70 are mutually fixed together by bolts being passed through the through holes described above, and by these bolts being screwed into and engaged in the screw holes described above.

The wall portion 520 extends in the vertical direction from a rear end portion of the tower attachment portion 52*b* to a front end portion of the upper attachment portion 52*u*. The rear end portion of the lower attachment portion 52*b* is a portion of the lower attachment portion 52*b* which is behind the first support bracket 70 attached to the lower attachment portion 52*b*, and which is adjacent to the first support bracket 70. And the front end portion of the upper attachment portion 52*u* is a portion of the upper attachment portion 52*u* which is in front of the second support bracket 80 attached to the upper attachment portion 52*u*, and which is adjacent to the second support bracket 80. As shown in FIG. 8, the wall portion 520 includes a flat plate shaped base portion 521, longitudinal reinforcement plates 522 and 523, a left reinforcement plate 524, and a right reinforcement plate 525. The longitudinal reinforcement plates 522 and 523 are flat plate members that extend along the vehicle front and rear direction. The reinforcement plates 522 and 523 include protruding portions 522*e* and 523*e* that protrude forwards, below the central axis Ax1 of the first exhaust treatment device 41. The left reinforcement plate 524 is a flat plate shaped member that extends in the leftward direction from the longitudinal reinforcement plate 522. And the right reinforcement plate 525 is a flat plate shaped member that extends in the rightward direction from the longitudinal reinforcement plate 523. As shown in FIG. 7, the left reinforcement plate 524 is bent in the forward direction at a point below the central axis Ax1 of the first exhaust treatment device 41, and is bent in the downward direction near the front edge of its protruding portion 522*e*. In a similar manner, the right reinforcement plate 525 also is bent in the forward direction at a point below the central axis Ax1 of the first exhaust treatment device 41, and is bent in the downward direction near the front edge of its protruding portion 523*e*. The longitudinal reinforcement plate 523 extends further upward above the upper attachment portion 52*u*. And a fixing hole 529 for attachment of a lifting hook is formed at the upper edge of the longitudinal reinforcement plate 523.

As shown in FIGS. 6 and 7, the upper attachment portion 52*u* is positioned above the wall portion 520. In other words, the upper attachment portion 52*u* is supported underneath by the wall portion 520. The base portion 521 of the wall portion 520 is connected to the front end portion of the upper attachment portion 52*u*. The upper attachment portion 52*u* is a flat plate shaped member that extends rearward from the abovementioned front end portion. The wall portion 520 includes an auxiliary support portion 526 that extends rearward from the base portion 521, in order to support the second support bracket 80 and the second exhaust treatment device 42, which are attached to the upper attachment portion 52*u*, and the upper attachment portion 52*u*. The upper attachment portion 52*u* is attached to the auxiliary support portion 526 by welding. Moreover, the second support bracket 80 is attached to the upper attachment portion 52*u* by welding. It should be understood that the second support bracket 80 could also be attached by some other attachment means, such as bolts and nuts or the like.

The mounting bracket 50 further includes a first intermediate connection portion 61, a second intermediate connection portion 62, and a third intermediate connection portion 63. The first intermediate connection portion 61, the second intermediate connection portion 62, and the third intermediate connection portion 63 are connected to mutually different intermediate portions of the engine 5. Such intermediate portions of the engine 5 may, for example, be portions which are above the crank case 22 of the engine 5 and which are below the upper surface of the cylinder head cover 26. Let an upper portion of the engine 5 be a portion that is at the same level as or higher than the upper surface of the cylinder head cover 26 of the engine 5, including the upper surface of the cylinder head cover 26. An intermediate portion of the engine 5 is positioned between the upper portions and the lower portions of the engine. In the following explanation, the expression "third connection portion" will be employed as a collective term for the first intermediate connection portion 61, the second intermediate connection portion 62, and the third intermediate connection portion 63. The first intermediate connection portion 61, the second intermediate connection portion 62, and the third intermediate connection portion 63 include through holes for passing bolts, and the mounting bracket 50 is fixed to intermediate portions of the engine 5 by bolts being passed through these screw holes and by these bolts being screwed into and engaged in screw holes provided upon the engine.

The mounting bracket 50 also includes a second connection portion 64. As shown in FIG. 7, the second connection portion 64 is connected to an upper portion of the engine 5 as described above. The front edge of the second connection portion 64 is attached to the upper attachment portion 52u. And the mounting bracket 50 further includes a relay connection pipe support portion 65. The relay connection pipe support portion 65 is an approximately letter-L-shaped member that projects forward from the longitudinal reinforcement plate 523. The relay connection pipe support portion 65 is connected to the right side surface of the longitudinal reinforcement plate 523. The relay connection pipe support portion 65 includes a support surface 66 that is shaped in a circular arc corresponding to the surface shape of the relay connection pipe 43. A first fixing member 67 having a letter-U curved shape can be attached to the relay connection pipe support portion 65. The relay connection pipe 43 is fixed by being clamped between the support surface 66 and the first fixing member 67.

The lower attachment portion 52b, the upper attachment portion 52u, and the wall portion 520 integrally constitute the upper mounting bracket 52. If the bolts in the lower attachment portion 52b and the upper surface 51u of the tower mounting bracket are removed, then it is possible to take off the exhaust treatment assembly 40 with a lifting hook by employing the fixing hole 529 in the upper edge of the longitudinal reinforcement plate 523 while the exhaust treatment assembly is attached to the upper mounting bracket 52. Accordingly, maintenance of the exhaust treatment assembly 40 becomes simple and easy.

Moreover, the mounting bracket 50 is attached to the engine 5 at a plurality of locations by the second connection portion 64 and the third connection portion (i.e. the first intermediate connection portion 61, the second intermediate connection portion 62, and the third intermediate connection portion 63). Since a heavy object (the second exhaust treatment device 42) is attached to the upper portion of the mounting bracket 50, accordingly vibration of the upper portion of the mounting bracket 50, in particular vibration thereof in the front and rear direction, can easily become great. However vibration of the upper portion of the mounting bracket 50 in the front and rear direction is reduced, since the second connection portion 64 and the third connection portion are fixed the mounting bracket 52 to the engine 5 at a plurality of locations.

The first support bracket 70 further includes a first left support portion 73 and a first right support portion 74. The first left support portion 73 and the first right support portion 74 include upper surfaces that are formed as circular arcs corresponding to the shape of the cylindrical side surface of the first exhaust treatment device 41. The first exhaust treatment device 41 is mounted to the first left support portion 73 and the first right support portion 74. A second fixing member 78 having a letter-U curved shape can be attached to the first left support portion 73. Moreover, a third fixing member 79 having a letter-U curved shape can be attached to the first right support portion 74. The first exhaust treatment device 41 is fixed to the first support bracket 70 by the second fixing member 78 being fastened to the first left support portion 73 and the third fixing member 79 being fastened to the first right support portion 74.

The first exhaust treatment device 41 is attached to the first support bracket 70, and is supported on the engine 5 via the mounting bracket 50. In other words, the first exhaust treatment device 41 is supported by the engine 5 via the first support bracket 70 and the mounting bracket 50. Moreover, the mounting bracket 50 is elastically supported upon the vehicle body frame 10. Accordingly, the first exhaust treatment device 41 is elastically supported upon the vehicle body frame 10 via the first support bracket 70 and the mounting bracket 50.

The second support bracket 80 further comprises a second left support portion 83 and a second right support portion 84. The second left support portion 83 and the second right support portion 84 include upper surfaces that are formed as circular arcs corresponding to the shape of the cylindrical side surface of the second exhaust treatment device 42. The second exhaust treatment device 42 is mounted to the second left support portion 83 and the second right support portion 84. A fourth fixing member 88 having a letter-U curved shape can be attached to the second left support portion 83. Moreover, a fifth fixing member 89 having a letter-U curved shape can be attached to the second right support portion 84. The second exhaust treatment device 42 is fixed to the second support bracket 80 by the fourth fixing member 88 being fastened to the second left support portion 83 and the fifth fixing member 89 being fastened to the third right support portion 84.

The second exhaust treatment device 42 is attached to the second support bracket 80, and is supported on the engine 5 via the mounting bracket 50. In other words, the second exhaust treatment device 42 is supported by the engine 5 via the second support bracket 80 and the mounting bracket 50. Moreover, the mounting bracket 50 is elastically supported upon the vehicle body frame 10. Accordingly, the second exhaust treatment device 42 is elastically supported upon the vehicle body frame 10 via the second support bracket 80 and the mounting bracket 50.

As shown in FIGS. 3 and 4, the rear mounting bracket 90 is attached to the rear surface of the flywheel housing 6. In other words, the rear mounting bracket 90 is disposed behind the mounting bracket 50. The rear mounting bracket 90 extends upward from the flywheel housing 6. In other words, at least a part of the rear mounting bracket 90 is positioned above the fly wheel housing 6. The rear mounting bracket 90 is positioned above the hydraulic pump 7. The rear mounting bracket 90 is also positioned below the upper surface of the cylinder head cover 26. The rear mounting bracket 90 is positioned below the cab 12. It should be understood that, in the explanation of this embodiment, the described positions in the vertical direction of the mounting bracket 50 and the rear mounting bracket 90 are referred to the centers of these brackets in the vertical direction. Alternatively, they may be referred to the positions of the bearing surfaces of the brackets.

As shown in FIG. 3, the damper 32L is supported by the mounting bracket support portion 10c of the vehicle body frame 10. And, as shown in FIG. 4, the damper 32R is supported by the mounting bracket support portion 10d of the vehicle body frame 10. In other words, the rear mounting bracket 90 is attached to the vehicle body frame 10 via the dampers 32L and 32R. The dampers 32L and 32R are arranged as mutually separated along the vehicle lateral direction. The dampers 32L and 32R include internal elastic members made from rubber or the like. Accordingly, the rear mounting bracket 90 is elastically supported on the mounting bracket support portions 10c and 10d of the vehicle body frame 10 via the dampers 32L and 32R. The engine 5 is connected to the rear mounting bracket 90 via the flywheel housing 6. Accordingly, the engine 5 is elastically supported upon the vehicle frame 10 via the rear mounting bracket 90 and the dampers 32L and 32R.

Characteristics

The bulldozer 1 according to this embodiment has the following characteristics.

(1) In this bulldozer 1, the first exhaust treatment device 41 is disposed in front of the engine 5, while the second exhaust treatment device 42 is disposed above the engine 5. And the longitudinal directions of the first exhaust treatment device 41 and the second exhaust treatment device 42 extend along the vehicle lateral direction. Moreover, as seen from the side of the vehicle, the front edge F2 of the second exhaust treatment device 42 is positioned behind the rear edge R1 of the first exhaust treatment device 41. Due to this, even though the engine cover 13 includes the upper surface 13a that slopes forward and downward, it is possible to avoid greatly raising that upper surface 13a by housing the first exhaust treatment device 41 and the second exhaust treatment device 42 within the engine compartment 8. As a result, it is possible to extend the region on the upper portion of the blade 15 of the working implement 4 which is visible to the operator, so that if is possible to avoid deterioration of the workability.

(2) The upper edge of the relay connection pipe 43 that is disposed over the first exhaust treatment device 41 is positioned below the upper edge of the second exhaust treatment device 42. Due to this, it is possible further to lower the height of the engine cover 13 by disposing the upper surface 13a of the engine cover 13 that slopes forward and downward along the upper edge of the second exhaust treatment device 42 and along the upper edge of the relay connection pipe 43. As a result, the operator is able visually to check a broader region upon the upper portion of the blade 15 of the working implement 4.

(3) The front edge F2 of the second exhaust treatment device 42 is positioned behind the rear edge R3 of the relay connection pipe 43. Accordingly the second exhaust treatment device 42 is disposed at a position nearer to the rear end in the engine compartment 8, where the height of the engine cover 13 rises. Thus, it is possible further to reduce the height of the engine cover 13. As a result, the operator is able visually to check a broader region upon the upper portion of the blade 15 of the working implement 4.

(4) As seen from the front of the vehicle, the second exhaust treatment device 42 includes a portion that is overlapped over the relay connection pipe 43. In other words, it becomes possible further to reduce the height of the engine cover 13, since the height of the second exhaust treatment device 42 becomes lower. As a result, the operator is able visually to check a broader region upon the upper portion of the blade 15 of the working implement 4.

(5) The second exhaust treatment device 42 is positioned in front of the center position ML of the engine 5 in the front and rear direction. Due to this, it is possible to arrange the exhaust treatment assembly 40 in a tighter configuration, since it is possible to shorten the conduit between the relay connection pipe 43 and the second exhaust treatment device 42. Accordingly maintenance of the exhaust treatment assembly 40 becomes simple and easy.

(6) The air cleaner 33 is disposed above the engine 5, and moreover below the upper surface 13a of the engine cover 13. Accordingly it is possible to take effective advantage of the package volume by disposing the air cleaner 33 in vacant space which is within the engine compartment 8 and which has been made available by housing the first exhaust treatment device 41 and the second exhaust treatment device 42 within the engine compartment 8. In other words, by packing the components at high density in the interior of the engine compartment 8, it is possible to make the engine compartment 8 more compact. As a result, it is possible for the operator visually to check a broader region upon the blade 15 of the working implement 4.

(7) The front edge F3 of the relay connection pipe 43 is positioned behind the front edge F1 of the first exhaust treatment device 41. As a result, it is possible to provide the front surface 13b and/or the curved surface 13c of the engine cover 13 more rearward. And, as a result, the operator is able visually to check a broader region upon the upper portion of the blade 15 of the working implement 4.

(8) The engine cover 13 includes the curved surface 13c that smoothly connects together the front surface 13b and the upper surface 13a. Due to this, it is possible for the operator visually to check a broader region on the upper portion of the blade 15 of the working implement 4, as compared to the case in which the front surface 13b and the upper surface 13a are directly connected together.

(9) The external diameter of the relay connection pipe 43 is shorter than the external diameter of the first exhaust treatment device 41 and the external diameter of the second exhaust treatment device 42. As a result, it is possible to reduce the curvature of the curved surface 13c of the engine cover 13. In other words, it is possible to increase the radius of the circular arc that defines the curved surface 13c. And, as a result, the operator is able visually to check a broader region upon the upper portion of the blade 15 of the working implement 4.

(10) The bulldozer 1 includes the blade drive mechanism 18 that drives the blade 15. When the blade 15 is raised to the greatest possible extent by the blade drive mechanism 18, the front surface 13b of the engine cover 13 is positioned in front of and below the rear edge R4 of the blade drive mechanism 18. Furthermore, the front edge F1 of the first exhaust treatment device 41 is also positioned in front of and below the rear edge R4 of the blade drive mechanism 18. Due to this, the first exhaust treatment device 41 is disposed in a space that, while being in front of the engine 5, also is not affected by the operating region of the blade drive mechanism 18. Accordingly it is possible to arrange the blade 15 in a position that is close to the cab 12, even though the exhaust treatment device is disposed in front of the engine 5.

(11) The hydraulic pump 7 is disposed behind the engine 5. If the hydraulic pump were to be disposed in front of the engine 5, then it would be necessary to elongate the engine cover 13 forward, and the visibility of the upper portion of the blade 15 of the working implement 4 would be deteriorated. However, actually, the hydraulic pump 7 is disposed behind the engine 5, while the first exhaust treatment device 41 is disposed in front of the engine 5. Moreover, since the longitudinal direction of the first exhaust treatment device 41 extends along the vehicle lateral direction, accordingly it is possible to manage with a shorter length in the vehicle front and rear direction for accommodating the first exhaust treatment device 41. Accordingly, it is possible to suppress protrusion forward of the engine cover 13. As a result, the operator is able visually to check a broader region upon the upper portion of the blade 15 of the working implement 4.

(12) The cab 12 is arranged behind the engine 5 and moreover over the hydraulic pump 7. Thus, in this bulldozer 1, there is no dead space over the hydraulic pump 7, since the cab 12 is positioned over the hydraulic pump 7 in this manner. Accordingly, with this bulldozer 1, the method of this embodiment of disposing the exhaust treatment assembly 40 above or in front of the engine 5 is effective.

(13) The first support bracket 70 that supports the first exhaust treatment device 41 and the second support bracket 80 that supports the second exhaust treatment device 42 are attached to the mounting bracket 50. Due to this, the tasks of fixing the first exhaust treatment device 41 and the second exhaust treatment device 42, or the tasks of taking them off, can be performed with each of the support brackets still being attached to the corresponding exhaust treatment device. Accordingly the tasks of fitting and removal become easy.

(14) The mounting bracket 50 comprises the lower attachment portion 52*b*, the upper attachment portion 52*u*, and the wall portion 52*0* that extends in the vertical direction from the rear end portion of the lower attachment portion 52*b* to the front end portion of the upper attachment portion 52*u*. Due to this, it is possible to arrange the first exhaust treatment device 41 and the second exhaust treatment device 42 in sequence in the vertical direction, so that increase in the size of the engine compartment 8 can be restrained.

(15) The mounting bracket 50 is connected to the lower portion of the engine 5 by the first connection portion (i.e. the left mounting bracket attachment portion 53*a* and the right mounting bracket attachment portion 54*a*). And the mounting bracket 50 is connected to the upper portion of the engine 5 by the second connection portion 64. Moreover, the mounting bracket 50 is connected to the intermediate portion of the engine 5 by the third connection portion (i.e. the first intermediate connection portion 61, the second intermediate connection portion 62, and the third intermediate connection portion 63). Accordingly, the mounting bracket 50 is compactly fixed to the engine 5. Due to this, it is possible to suppress the amounts of protrusion of the upper surface 13*a*, the front surface 13*b*, and the curved surface 13*c* of the engine cover 13.

Modifications

While an embodiment of the present invention has been explained above, the present invention is not limited to the above described embodiment and various modifications are possible within the gist of the present invention.

The shapes of the mounting bracket 50 and the rear mounting bracket 90 are not limited to the aforementioned shapes, and they could be varied as appropriate. Moreover, the shapes of the first support bracket 70 and the second support bracket 80 are not limited to the aforementioned shapes described above, and they could be varied as appropriate. Yet further, the mounting bracket 50, the first support bracket 70, and the second support bracket do not need to be separate components, and they may be formed as a single integrated unit.

In the embodiment described above, it is described that the first exhaust treatment device 41 is a diesel oxidation catalyst device, while the second exhaust treatment device 42 is a selective catalytic reduction (SCR) device. However, the first exhaust treatment device 41 may be a selective catalytic reduction (SCR) device, while the second exhaust treatment device 42 may be a diesel oxidation catalyst device. But, since it is desirable for the exhaust from the engine to be fed into the diesel oxidation catalyst device first, in this case, the sequence and the orientations of the pipes that connect to the first exhaust treatment device 41 and the second exhaust treatment device 42 should be opposite.

It should be understood that it would also be possible for the first exhaust treatment device 41 not to be a diesel oxidation catalyst device, but to be a diesel particulate filter device.

The first exhaust treatment device 41 and the second exhaust treatment device 42 are not limited to being cylindrical or the like: they could have other shapes, for example they could be shaped as elliptic cylinders or rectangular parallelepipeds or the like. In this case, the shapes of the support portions (73, 74) that support the first exhaust treatment device 41 and the shapes of the support portions (83, 84) that support the second exhaust treatment device 42 would respectively correspond to the shapes of the side surfaces of the first exhaust treatment device 41 and to the shapes of the side surfaces of the second exhaust treatment device 42.

There may be any number of dampers 31L, 31R, 32L, and 32R. However, it is desirable for the same number of dampers to be provided on the left side and on the right side.

Each of the number of the support portions (73, 74) that support the first exhaust treatment device 41, the number of the support portions (83, 84) that support the second exhaust treatment device 42, the number of the fixing members (78, 79) that fix the first exhaust treatment device 41, and the number of the fixing members (88, 89) that fix the second exhaust treatment device 42, is not limited to being two; these numbers may be one, or three or more.

The numbers and the positions of the holes for attaching the components included in the mounting bracket 50, the first support bracket 70, and the second support bracket 80 may be varied as appropriate. Moreover, the method of fixing shown in the embodiment is only given as an example, and it would also be possible to attach the components to the mounting bracket 50, the first support bracket 70, and the second support bracket 80 by some other method of fixing. For example, the fixing means may be by hooks, or by welding or the like.

According to the present invention, it is possible to provide a bulldozer with which deterioration of the workability is prevented, even though at least two exhaust treatment devices are housed in the engine compartment.

The invention claimed is:

1. A bulldozer, comprising:
    a blade arranged at a front end of the bulldozer relative to a front/rear direction of the bulldozer;
    an engine disposed rearward of the blade in the front/rear direction of the bulldozer;
    a cab disposed rearward of the engine in the front/rear direction of the bulldozer;
    a cooling device disposed rearward of the cab in the front/rear direction of the bulldozer;

a first exhaust treatment device arranged and configured to treat exhaust from the engine, the first exhaust treatment device being disposed in front of the engine in the front/rear direction of the bulldozer, and lower than a first upper surface of the engine in a vertical direction of the bulldozer, the vertical direction being perpendicular to the front/rear direction;

a second exhaust treatment device arranged and configured to treat exhaust from the engine, the second exhaust treatment device being disposed above the engine in the vertical direction of the bulldozer; and an engine cover covering the engine, the first exhaust treatment device, and the second exhaust treatment device, the engine cover including a second upper surface sloping forward and downward in the front/rear direction and vertical direction, respectively, of the bulldozer, longitudinal directions of the first exhaust treatment device and the second exhaust treatment device extending along a lateral direction of the bulldozer, the lateral direction being perpendicular to the front/rear direction and the vertical direction of the bulldozer, the second exhaust treatment device including a portion that overlaps the engine as seen in a top view of the bulldozer, and as seen from a side of the bulldozer, a front edge of the second exhaust treatment device being positioned behind a rear edge of the first exhaust treatment device in the front/rear direction of the bulldozer.

2. The bulldozer according to claim 1, further comprising a blade drive mechanism arranged and configured to drive the blade; and a front surface of the engine cover being positioned forward of the blade drive mechanism in the front/rear direction of the bulldozer and below a rear edge of the blade drive mechanism in the vertical direction of the bulldozer when the blade is raised by the blade drive mechanism to a maximum extent.

3. The bulldozer according to claim 1, further comprising a hydraulic pump disposed behind the engine.

4. The bulldozer according to claim 1, further comprising a relay connection pipe connecting the first exhaust treatment device and the second exhaust treatment device, the relay connection pipe being disposed over the first exhaust treatment device, the relay connection pipe including a straight line portion;

a longitudinal direction of the straight line portion extending along the lateral direction of the bulldozer; and the straight line portion including a part overlapping the engine in a front view.

5. The bulldozer according to claim 4, wherein the front edge of the second exhaust treatment device is positioned behind a rear edge of the relay connection pipe in the front/rear direction of the bulldozer.

6. The bulldozer according to claim 4, wherein as seen from a front of the bulldozer, the second exhaust treatment device includes a portion that is overlapped over the relay connection pipe.

7. The bulldozer according to claim 4, wherein the second exhaust treatment device is positioned forward of a center position of the engine along the front/rear direction of the bulldozer.

8. The bulldozer according to claim 4, wherein a front edge of the relay connection pipe is positioned rearward of a front edge of the first exhaust treatment device in the front/rear direction.

9. The bulldozer according to claim 4, wherein the engine cover further includes
a front surface extending along the first exhaust treatment device and the relay connection pipe, and
a curved surface connecting the second upper surface and the front surface smoothly.

10. The bulldozer according to claim 8, wherein an external diameter of the relay connection pipe is shorter than an external diameter of the first exhaust treatment device and an external diameter of the second exhaust treatment device.

11. The bulldozer according to claim 4, wherein
as seen from the side of the bulldozer, an angle between a vertical direction and a straight line that joins a point indicating a central axial line of the first exhaust treatment device and a point indicating a central axial line of the relay connection pipe is between 0° and 20°;
as seen from the side of the bulldozer, an angle between the vertical direction and a straight line that joins the point indicating the central axial line of the relay connection pipe and a point indicating a central axial line of the second exhaust treatment device is between 40° and 70°; and
as seen from the side of the bulldozer, an angle between the vertical direction and a straight line that joins the point indicating the central axial line of the first exhaust treatment device and the point indicating the central axial line of the second exhaust treatment device is between 10° and 40°.

12. The bulldozer according to claim 4, wherein an upper edge of the relay connection pipe is positioned below an upper edge of the second exhaust treatment device in the vertical direction of the bulldozer.

13. The bulldozer according to claim 1, further comprising
a mounting bracket attached to the engine;
a first support bracket supporting the first exhaust treatment device, the first support bracket being attached to the mounting bracket; and
a second support bracket supporting the second exhaust treatment device, the second support bracket being attached to the mounting bracket.

14. The bulldozer according to claim 13, wherein the mounting bracket includes
a lower attachment portion attached to the first support bracket,
an upper attachment portion attached to the second support bracket, and
a wall portion extending in a vertical direction from a rear end portion of the lower attachment portion to a front end portion of the upper attachment portion.

15. The bulldozer according to claim 13, wherein the mounting bracket includes
a first connection portion connected to a lower portion of the engine,
a second connection portion connected to an upper portion of the engine, and
a third connection portion connected to an intermediate portion of the engine between the upper portion and the lower portion.

16. The bulldozer according to claim 1, further comprising
an air cleaner disposed higher than the engine in the vertical direction of the bulldozer, the engine cover further covering the air cleaner, a longitudinal direction of the air cleaner extending along the lateral direction of the bulldozer.

17. The bulldozer according to claim 16, wherein the air cleaner is positioned rearward of a center position of the engine in the front/rear direction of the bulldozer.

* * * * *